(12) United States Patent
Diab

(10) Patent No.: US 8,284,798 B2
(45) Date of Patent: Oct. 9, 2012

(54) POE COMMUNICATION BUS, INTERFACE, AND PROTOCOL BETWEEN POE SUBSYSTEM AND PHY OR SWITCH SUBSYSTEMS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 489 days.

(21) Appl. No.: 11/783,730

(22) Filed: Apr. 11, 2007

(65) Prior Publication Data
US 2008/0253392 A1    Oct. 16, 2008

(51) Int. Cl.
*H04J 3/16* (2006.01)
(52) U.S. Cl. .......................... 370/466; 348/148
(58) Field of Classification Search .......... 370/464, 370/465, 466; 348/143
See application file for complete search history.

(56) References Cited

U.S. PATENT DOCUMENTS

| | | | |
|---|---|---|---|
| 6,473,608 B1 | 10/2002 | Lehr et al. | |
| 2004/0164619 A1 | 8/2004 | Parker | |
| 2007/0074052 A1 | 3/2007 | Hemmah et al. | |
| 2007/0076094 A1* | 4/2007 | Dickerson et al. | 348/143 |

OTHER PUBLICATIONS

European Search Report issued Jul. 23, 2008 for Appl. No. EP 08007132, 4 pages.

* cited by examiner

*Primary Examiner* — Kimbrom T Hailu
*Assistant Examiner* — Dady Chery
(74) *Attorney, Agent, or Firm* — Sterne, Kessler, Goldstein & Fox PLLC (57) ABSTRACT

Provided is a communications interface system. The communications interface system includes one or more protocol modules configured to include interface protocols that facilitate direct communication between a switching subsystem, a physical layer subsystem, and a Power over Ethernet subsystem. The protocol modules are connectable to a communications bus, the direct communication occurring across the communications bus in accordance with the protocols.

20 Claims, 5 Drawing Sheets

FIG. 3A
(Conventional)

POE COMMUNICATION BUS, INTERFACE, AND PROTOCOL BETWEEN POE SUBSYSTEM AND PHY OR SWITCH SUBSYSTEMS

BACKGROUND OF THE INVENTION

1. Field of the Invention

The present invention generally relates to Power over Ethernet (PoE) devices, and more specifically to efficient communications between a PoE subsystem, power source equipment (PSE) subsystems, and switching subsystems.

2. Related Art

Ethernet communications provide high speed data communications over a communications link between two communications nodes that operate according the IEEE 802 Ethernet Standard. The communications medium between the two nodes can be twisted pair wires for Ethernet, or other types communications medium that are appropriate. PoE communication systems provide power and data communications over a common communications link. More specifically, a PSE device connected to the physical layer of the first node of the communications link provides direct current (DC) power (for example, 48 volts DC) to a powered device (PD) at the second node of the communications link. The DC power is transmitted simultaneously over the same communications medium with the high speed data from one node to the other node.

Example PD devices that utilize PoE include Internet Protocol (IP) phones, wireless access points, etc. The PSE subsystem is often a data switch having at least two rows of data ports, where a data port in the input row of data ports can be switched to any one of the data ports in the output row of data ports. Each data port typically includes a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

On the PSE chip portion of the PoE device, the DC voltage supply circuit provides a voltage, e.g., 48 volts, to power the PD. The DC voltage supply and its corresponding output voltage, are controlled by the PSE controller. For example, the PSE controller includes a switch connected across output terminals of the DC voltage supply circuit for determining when its output voltage is switched on or off. The PSE subsystem also performs functions such as discovering a presence of PD devices by checking for characteristic resistances, managing/integrating power, and monitoring current draw.

Within a PoE communications system, two power domains are present having two separate ground references. An isolation transformer is provided to isolate one ground reference system (i.e., the wire side of the system) from the other ground reference system (i.e., the system side). Accordingly, an isolation boundary is provided such that when an energy pulse is injected on the wire (e.g., Ethernet cable) relative to the ground of the connector, that ground is electrically isolated from the ground reference system for the remaining electronics behind the transformer.

The PoE device fundamentally sits on the wire side of the transformer so it is under the other ground system. Because of the isolation and floating ground references, if the PoE communications system needs to communicate or be controlled by an electronic subsystem on the other side of the transformers (non-wire or isolated side), then the isolation boundary must be crossed.

One of the most common ways of crossing the isolation boundary is to use opto-isolators or opto-coupling devices. Opto-isolators can be placed along the feedback path between the PSE controller and the PHY. As understood by those of skill in the art, opto-isolators are made up of a light emitting device, and a light sensitive device, wrapped in a single package, but having no electrical connection between the two. A beam of light facilitates transmission of the signals across the isolation boundary. The light emitter is nearly always an LED.

An important aspect of conventional PoE communications system is the ability to connect the PoE device to a host subsystem within the PoE communications system. This connection provides configuration, control, and status reporting between the PoE subsystem, the PHY subsystem, and the switching subsystem. The conventional PoE communications systems, however, waste multiple communication paths between host and PoE as well as host and PHY/switch. That is, these additional communications paths require additional control interfaces and additional control circuitry/modules etc.

Furthermore, in these conventional communications systems, the PoE interface is unique, and is specific to a control logic/module that interacts with the host subsystems. The unique nature of this interface complicates the ability to mix and match switch and PHY technologies with PoE technologies without knowing of, or having control circuitry that is specific to each solution.

What is needed, therefore, is a more efficient and flexible way to connect PoE technologies to the host that would reduce the number of interfaces and control/logic modules and allow for an easy mix and match of switch and PHY solutions with PoE solutions. What is also needed is an ability to mix and match switch and PHY technologies without concern for the type of control interface present on the PoE and without knowledge of what control modules are needed for the switching subsystem and/or the PHY subsystem.

BRIEF SUMMARY OF THE INVENTION

In one embodiment, the present invention includes a communications interface system. The communications interface system includes one or more protocol modules configured to include interface protocols that facilitate direct communication between a switching subsystem, a PHY subsystem, and a PoE subsystem. The protocol modules are connectable to a communications bus, the direct communication occurring across the communications bus in accordance with the protocols.

The present invention is an improved PoE communications system architecture that provides an efficient and flexible way to connect various PoE technologies to the host subsystem. This improved architecture ultimately reduces the number of interfaces and control/logic modules required within the PoE communications system, by eliminating the need for an outside control module.

The present invention also facilitates more easily mixing and matching switch and PHY solutions with PoE solutions. More particularly, the present invention provides an ability to mix and match switch and PHY technologies without the concern for what type of control interface is present on the PoE or what control modules are needed for the switch and/or the PHY.

The present invention offers several advantages over traditional PoE communications systems. First, the present invention eliminates the need for a host central processor unit (CPU)/microcontroller dedicated for PoE control and/or eliminates the need for an additional interface on the host CPU/microcontroller dedicated for the PoE. Additionally, the present invention simplifies the design of the PoE communications system. This simplification makes it easier and more flexible for systems engineers. That is, by using the present invention, engineers can focus on selecting the most suitable switch and/or PHY that is most suitable for the application at hand in terms of power, density, number of ports, cost, etc. This plug and play aspect is possible, however, when all of the devices are equipped with an interface constructed in accordance with the present invention.

Additional features and advantages of the invention will be set forth in the description that follows, and in part will be apparent from the description, or may be learned by practice of the invention. The advantages of the invention will be realized and attained by the structure and particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appending claims.

It will be apparent to one skilled in the art that the present invention, as described below, may be implemented in many different embodiments. Any actual software code implementing the present invention is not limiting of the present invention. Thus, the operational behavior of the present invention will be described with the understanding that modifications and variations of the embodiments are possible, given the level of detail presented herein.

Figure 1:
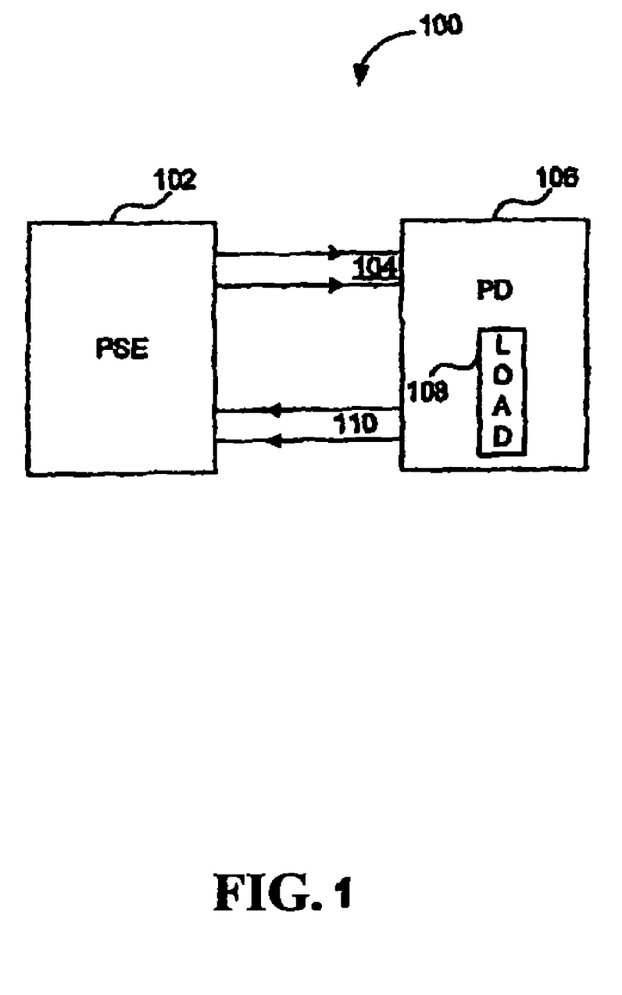
FIG. 1 is a block diagram of a conventional PoE system.

FIG. 1 illustrates a high level diagram of a conventional PoE system 100 that provides both DC power and data communications over a common data communications medium. Referring to FIG. 1, power source equipment 102 provides DC power over conductors 104, 110 to a PD 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
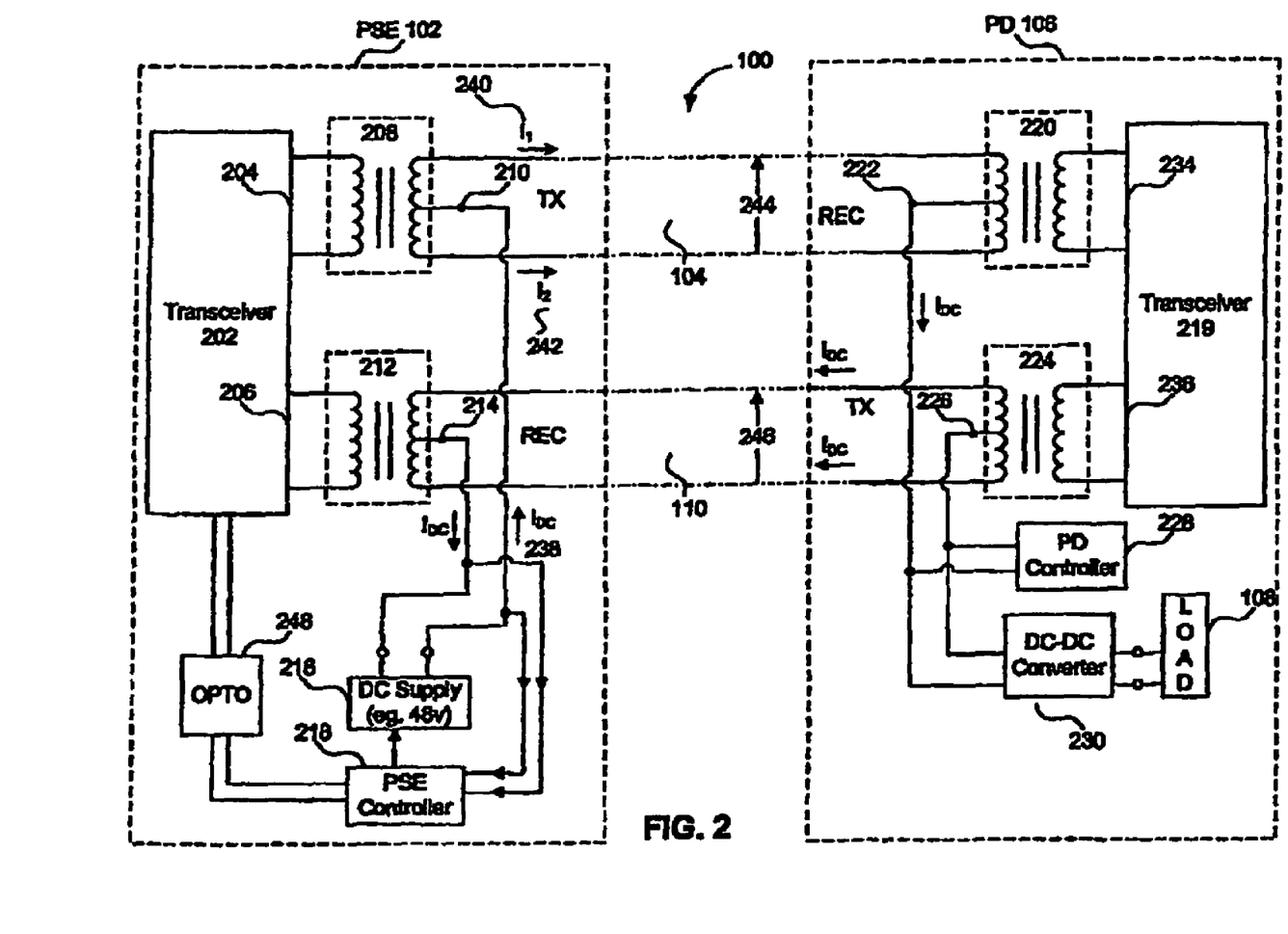
FIG. 2 illustrates a more detailed figure of the conventional power transfer from the PSE to PD in a conventional PoE communications system.

FIG. 2 provides a more detailed circuit diagram of the PoE system 100, where PSE 102 provides DC power to PD 106 over conductor pairs 104 and 110. PSE 102 includes a transceiver PHY 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the PHY 202, but isolate any low frequency or DC voltage from the transceiver ports, which may be sensitive to large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. A DC voltage supply 216 generates an output voltage that is applied across the respective center taps of the transformers 208 and 210 on the conductor side of the transformers. The center tap 210 is connected to a first output of the DC voltage supply 216, and the center tap 214 is connected to a second output of the DC voltage supply 216. As such, the transformers 208 and 212 isolate DC voltage produced by the DC supply 216 from the sensitive data ports 204, 206 of the PHY 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216.

As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not affected by the DC power transfer. An opto-isolator 248, discussed in greater detail below, provides transmission of signals across a DC voltage isolation boundary between the PSE controller 218 and the PHY 202.

As discussed above, in one example, the PSE 102 is a data switch that is communicating data traffic with one or more PD devices, such as Internet phones, or a wireless access point. The data switch has an input row of data ports and an output row of data ports, where any one of the input data ports can to be switched to any one of the output data ports. Each data port typically includes a SERDES transceiver so that data can be received and transmitted using high speed serial techniques, but are processed in parallel on chip.

Figure 3A:
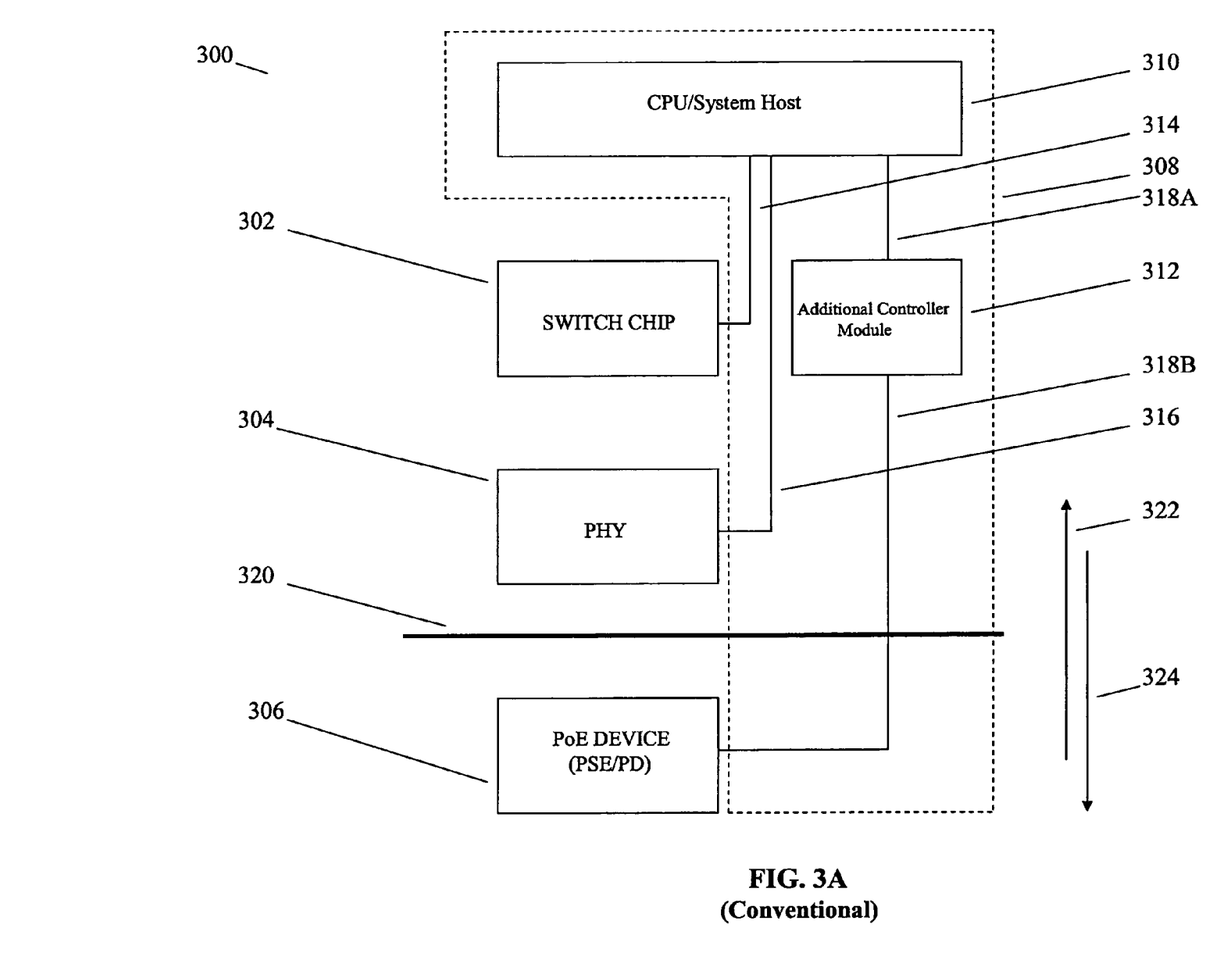
FIG. 3A is a block diagram of a conventional legacy PoE system communications interface.

FIG. 3A is a block diagram illustration of a conventional legacy PoE communications interface system 300. The legacy PoE communications system 300 includes a switching subsystem 302, a PHY subsystem 304, and a PoE subsystem 306. The switching subsystem 302, the PHY subsystem 304, and the PoE subsystem 306 can be embedded within the same PCB or can be spread across a number of different PoE communications system PCBs.

In the legacy PoE communications system 300 of FIG. 3A, the PoE subsystem 306 is connected to the switching subsystem 302 and the PHY subsystem 304 via a host's control subsystem 308. The host's control subsystem 308 includes a CPU/System Host 310 and an additional controller module 312. The additional controller module 312 can be, for example, another CPU, a microcontroller, or a field programmable gate array (FPGA).

The CPU/system host 310 provides a communications path between the PoE subsystem 306, the switching subsystem 302, and the PHY subsystem 304. More specifically, the CPU/system host 310 communicates to the switching subsystem 302 and the PHY subsystem 304 via respective interfaces 314 and 316. The interfaces 314 and 316 enable the host 310 to configure and control the switching subsystem 302 and the PHY subsystem 304, thus providing data plane set-up for the legacy PoE communications system 300. The interface 316 is often implemented as a management input/output (MDIO) interface.

The additional controller module 312 acts as an intermediary between the host 310 and the PoE subsystem 306. As shown in FIG. 3A, the additional controller module 312 is connected to the PoE subsystem 306 along an interface 318A/318B. Traditionally, the interface 318A/318B is implemented as an inter-IC ($I^2C$) bus, a parallel bus, or a number of other suitable configurations. The interface 318A/318B connects to the PoE subsystem 306 across an isolation boundary 320.

In the communications system 300, the interface 318A, the additional controller module 312, and the interface 318B are used to communicate PoE status and configuration information 322/324 between the PoE subsystem 306 and the host 310.

Thus, in the traditional communications system 300, two independent channels of communication are required for the PoE subsystem 306 to communicate with the switching subsystem 302 and the PHY subsystem 304. The first communications channel includes the interface 314 and the MDIO interface 316. The second communications channel includes the $I^2C$/parallel bus 318A/318B, along with the additional controller module 312.

Figure 3B:
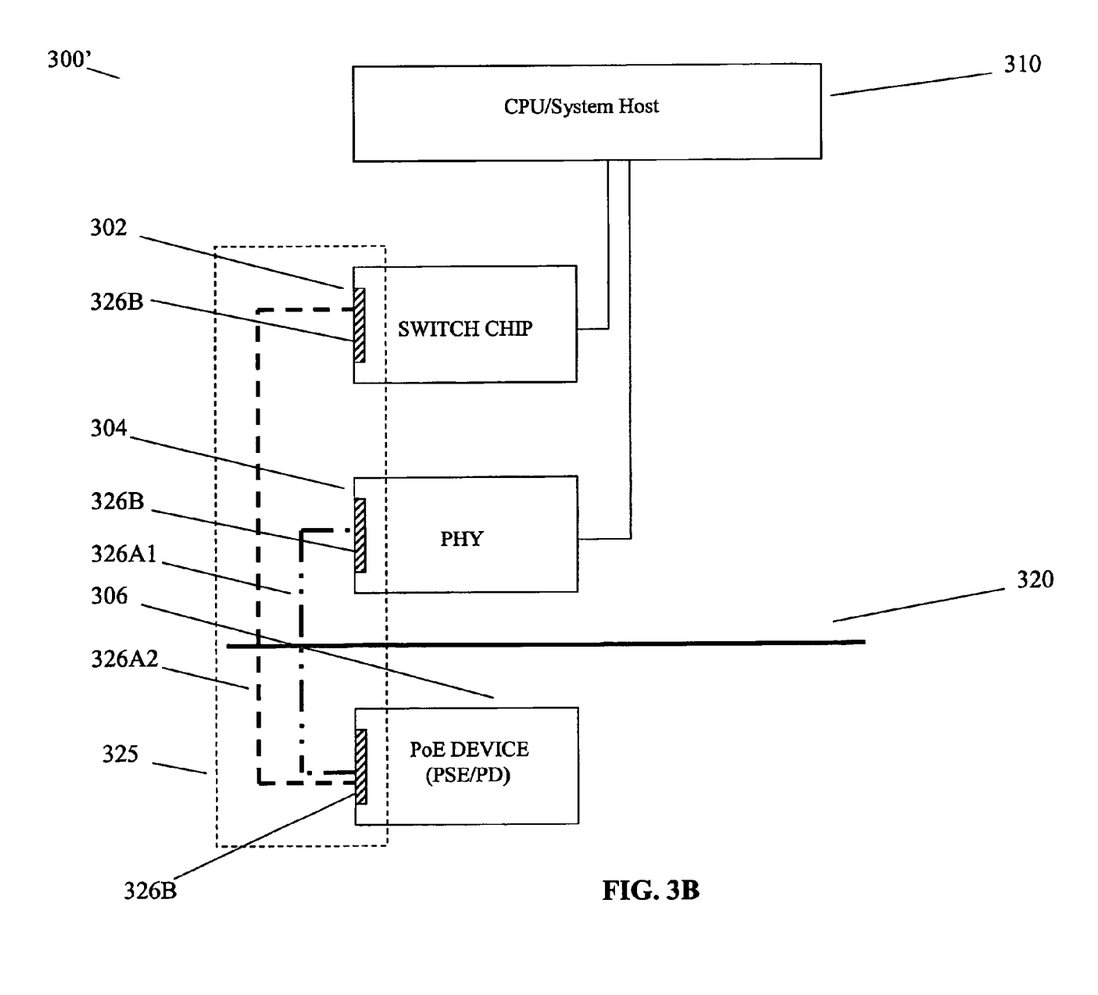
FIG. 3B is a block diagram illustration of a PoE system communications interface constructed in accordance with the present invention.

FIG. 3B is a block diagram illustration of a PoE communications interface system 300' constructed in accordance with an embodiment of the present invention. In the communications system 300', an interface is provided that enables the PoE subsystem 306 to communicate directly with the switching subsystem 302 or the PHY subsystem 304. This direct communication can occur without the need of an additional CPU, such as the additional controller module 312, discussed above with reference to FIG. 3A.

More specifically, within the communications system 300', the PoE subsystem 306 can be configured to physically attach directly to the PHY subsystem 304 or the switching subsystem 302 via a communications bus 325. The communications bus 325 can attach to the PSE side of the PoE subsystem or on the PD side of the communications system 300'. Additionally, the communications bus 325 can be configured to operate in scenarios where the PHY subsystem and the switching subsystem are formed on the same application specific integrated circuit (ASIC).

The communications bus 325 includes a physical interface 326A1 for connecting the PoE subsystem 306 to the PHY subsystem 304. Also included is a physical interface 326A2 for connecting the PoE subsystem 306 to the switching subsystem 302. By way of example, in one embodiment of the present invention, the communications system 300' replaces the interface 318A of FIG. 3A with the physical interface 326A1 to form a direct connection to the PHY subsystem 304. In another embodiment of the present invention, the communications system 300' replaces the interface 318A of FIG. 3A with the physical interface 326A2 to form a direct connection to the switching subsystem 302. In yet another embodiment of the present invention, the PoE subsystem 306 connects directly to the PHY subsystem 304 or the switching subsystem 302, but not both at the same time.

The physical interfaces 326A1 and 326A2 can include connection ports and can both be implemented as an I²C bus, parallel bus, serial bus, serial peripheral interface (SPI), MDIO, or other type. In the present invention, the communications bus 325 can achieve speeds, for example, from about 100-400 KHz for I²C to over 2 MHz for MDIO. Also in the present invention, the physical interface can be adapted to operate with a switch (e.g., PoE-PSE or PoE-PD) and a PHY (e.g., PoE-PSE or PoE-PD).

Further, on the PoE side: 802.3af, 802.3 at, legacy PoE transmission and/or any type of PoE transmission standards can apply. On the data side: 10BASE-T, 100BASE-TX, 1000BASE-T, 10GBASE-T and/or any other layer 2 PHY technology standards can apply.

By way of background, a typical PHY can be coupled, for example, to a medium access control (MAC) block via an X-type media independent interface (xMII). As understood by those of skill in the art, the interface can be implemented as a giga-bit (GMII), serial MII (SMII), a serial giga-bit MII (SGMII), or a reduced MII (RMII), or similar, interface. The PHY can include, for example, an interface to provide access to specific registers within the PHY.

At a high level, the present invention operates in a manner similar to an SMII. That is, whereas an SMII facilitates communication between the PHY and the MAC block (as noted above), the present invention facilitates communication between the PHY subsystem and the switching subsystem, or between the PHY subsystem and the PoE, or between all of these devices.

As noted above with respect to the interface 318, the communications bus 325 connects the PoE subsystem 306 to the PHY subsystem 304 and/or the switching subsystem 302 across the isolation boundary 320. The isolation boundary 320 can be crossed using, for example, optos, magnetics, or some other similar implementation.

In addition to the actual hardware physical interfaces 326A1 and 326A2, the communications bus 325 also includes a protocol module 326B. The protocol module 326B can be stand alone or respective modules can be embedded within each of the PoE subsystem 306, the PHY subsystem 304, and the switching subsystem 302, as illustrated in FIG. 3B. The protocol module 326B controls how information is encapsulated across the physical interfaces 326A1 and 326A2. By way of example, these protocols can determine whether information is carried in message format or packet format. These protocols are well known to those of skill in the art and are necessary to facilitate efficient communication across the physical interfaces 326A1 and 326A2 and correspondingly between the PoE subsystem 306, the PHY subsystem 304, or the switching subsystem 302. As noted above, the communications bus 325 can be used to communicate control information and report back status within the interface system 300'.

Figure 4:
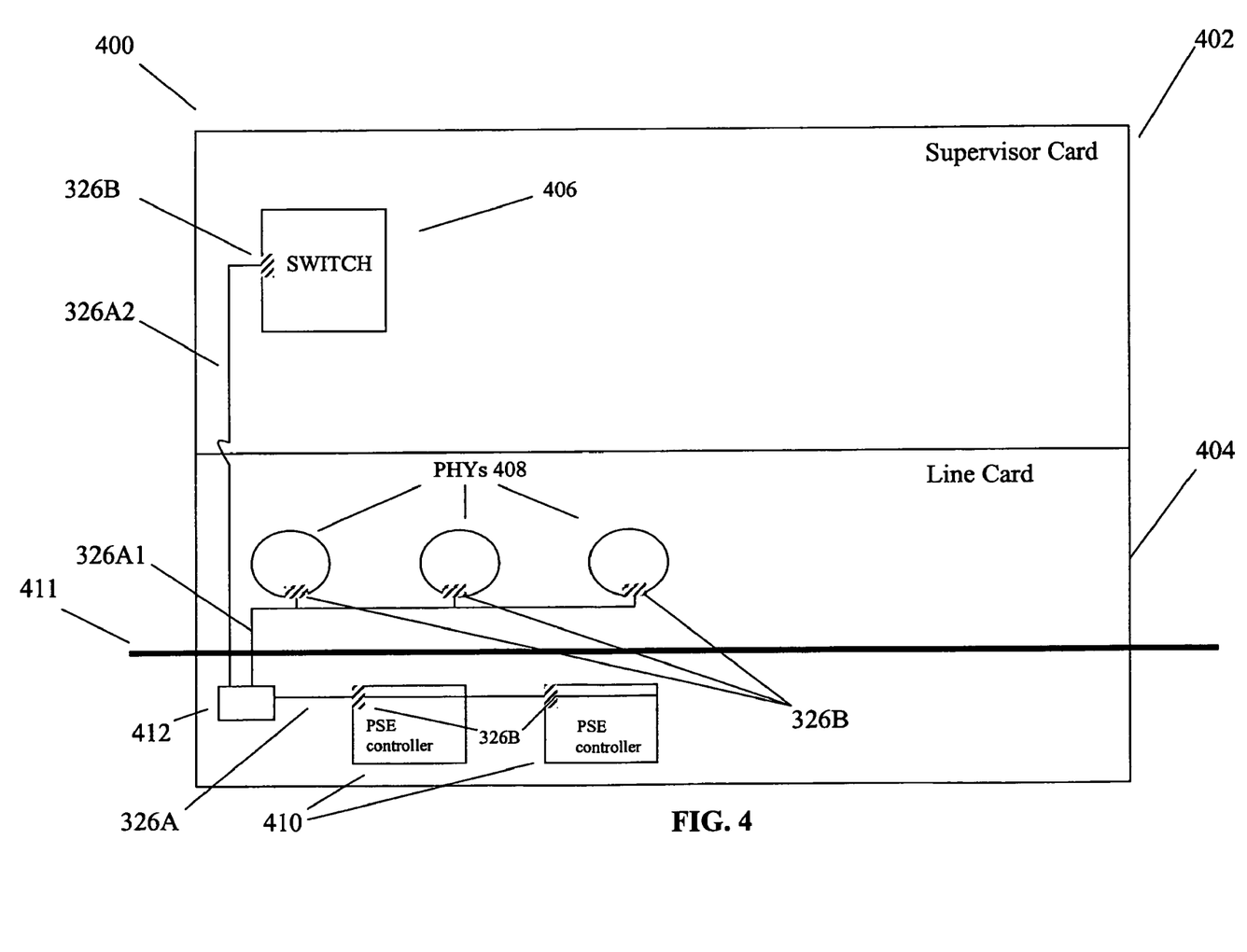
FIG. 4 is a block diagram illustration of the communications interface shown in FIG. 3B configured to connect to multiple PSE devices.

The physical interfaces 326A1/326A2 and the protocol module 326B enable the PoE subsystem 306 (e.g., poe-pse and poe-pd) to plug directly into the PHY subsystem 304 or the switching subsystem 302. This direct plug-in eliminates the need to connect through an additional controller module 312 and eliminates the need for the interface 318A, which connects to the CPU/System host 310 in FIG. 3A FIG. 4 is a block diagram illustration of one slice of a PoE connection scheme based upon the communications bus 325 of FIG. 3B. In FIG. 4, a card 400 includes a supervisor card portion 402 and a line card portion 404. The supervisor card portion 402 is coupled to a single switching subsystem 406 and the daughter card 404 is coupled to multiple PHY subsystems 408. Each of the PHY subsystems 408 includes a protocol module 326B. The switching subsystem 406 also includes the protocol module 326B and is connected to the PHY subsystems 408 via the physical interface 326A1. The switching subsystem 406 and the PHY subsystem 408, are in turn connected to a group of PSE controllers 410, each including a protocol module 326B. The switching subsystem 406 and the PHY subsystems 408 connect to the PSE controllers across an isolation boundary 411.

The switching subsystem 406 and the PHY subsystem 408 are connected to the PSE controllers 410 across the isolation boundary 411 via an opto-isolator 412. Transmission characteristics of the opto-isolator 412, along with shielding properties of the isolation boundary 411, cooperate to enable the PSE controllers 410 to meet or exceed specified electromagnetic interference (EMI) requirements.

Although the switching subsystem 406, the PHY subsystems 408, and the PSE controllers 410 appear in FIG. 4 as being in close proximity, in reality the PSE controllers 410 can be in completely different physical location from the PHYs and the switch.

As noted above, however, the physical interface 326A1 is configurable to provide communication between the PSE controllers 410 and the PHY subsystems 408. The physical interface 326A2 is configurable to provide communication between the PSE controllers 410 and the switching subsystem 406. This communication is provided regardless of the physical proximity of these subsystems to one another. This connectivity can be accommodated regardless of whether a single PSE controller is sharing the physical interface 326A with the single switching subsystem 406 and with one of the PHY subsystems 408, or whether there is a completely different connection scheme. This connectivity is based, in part, upon the use of a common set of communication protocols on the physical interfaces 326A1 and 326A2. The connectivity is also based on the use of these protocols with any of the PSE controllers 410, the PHY subsystems 408, and the switching subsystem 406.

Although the exemplary embodiment of FIG. 4 illustrates multiple ports associated with the PSE controller 410, in practice, although not shown in FIG. 4, a PD could also include multiple ports.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A communications interface comprising:
one or more protocol modules including interface protocols to facilitate communication between a switching device, a physical layer (PHY) device, and a Power over Ethernet (PoE) device, the PoE device being separated from the switching device and the PHY device by an isolation boundary;
wherein the protocol modules are connectable to a communications bus, the communication occurring in accordance with the protocols; and
wherein the switching device and the PHY device are configured for direct connection to each other and to the PoE device, the direct connection occurring (i) within the communications bus and (ii) across the isolation boundary.

2. The communications interface system of claim 1, wherein each of the switching device, the PHY device, and the PoE device includes one of the protocol modules.

3. The communications interface system of claim 1, wherein the direct communication occurs along a communications path that is devoid of an intermediary between any of the switching device, the PHY device, and the PoE device.

4. The communications interface system of claim 1, wherein the PoE device is a PoE controller.

5. The communications interface system of claim 1, wherein the PoE device is a powered device.

6. The communications interface system of claim 1, wherein the communications bus is at least one from the group including an inter-IC (I²C) bus, parallel bus, serial, serial peripheral interface (SPI), management input/output (MDIO).

7. The communications interface system of claim 1, wherein the PoE device includes one or more power source equipment (PSE) controllers, each including at least one of the protocol modules.

8. The communications interface system of claim 7, wherein the one or more PSE controllers is in a different physical location from the switching device and the PHY device.

9. An apparatus, comprising:
one or more protocol modules including interface protocols to facilitate communication between a switch, a physical layer (PHY) device, and a Power over Ethernet (PoE) device, the PoE device being separated from the switch and the PHY device by an isolation boundary;
wherein the protocol modules are connectable to a communications bus, the communication occurring in accordance with the protocols; and
wherein the switch and the PHY device are configured for direct connection to each other and to the PoE device, and the direct connection occurs (i) within the communications bus and (ii) across the isolation boundary.

10. The apparatus of claim 9, wherein each of the switch, the PHY device, and the PoE device includes one of the protocol modules.

11. The apparatus of claim 9, wherein the direct communication occurs along a communications path that is devoid of an intermediary between any of the switch, the PHY device, and the PoE device.

12. The apparatus of claim 9, wherein the PoE device is a PoE controller.

13. The apparatus of claim 9, wherein the PoE device includes one or more PSE controllers, each including at least one of the protocol modules.

14. The apparatus of claim 13, wherein the one or more PSE controllers is in a different physical location from the switch and the PHY device.

15. A communications interface comprising:
one or more protocol modules including interface protocols to facilitate communication between a Power over Ethernet (PoE) device and at least one of a switching device and a physical layer (PHY) device, the PoE device being separated from the at least one of the switching device and the PHY device by an isolation boundary;
wherein the protocol modules are connectable to a communications bus, the communication occurring in accordance with the protocols; and
wherein the at least one switching device and PHY device are configured for direct connection to each other and to the PoE device, the direct connection occurring (i) within the communications bus and (ii) across the isolation boundary.

16. The communications interface of claim 15, wherein the PoE device includes one or more PSE controllers, each including at least one of the protocol modules, and wherein the one or more PSE controllers is in a different physical location from the at least one of the switching device and the PHY device.

17. A communications interface comprising:
one or more protocol modules including interface protocols to facilitate communication between a Power over Ethernet (PoE) device and only one of a switching device and a physical layer (PHY) device during a communications session, the PoE device being separated from the only one of the switching device and the PHY device by an isolation boundary;
wherein the protocol modules are connectable to a communications bus, the communication occurring in accordance with the protocols; and
wherein the only one switching device and the PHY device are configured for direct connection to each other and to the PoE device, the direct connection occurring (i) within the communications bus and (ii) across the isolation boundary.

18. The communications interface system of claim 1, wherein the PoE device includes a power source equipment subsystem and a powered device.

19. The communications interface system of claim 18, wherein the communications bus attaches to a power source equipment subsystem side of the PoE device or to a powered device side of the PoE device.

20. The communications interface of claim 17, wherein the PoE device includes one or more PSE controllers, each including at least one of the protocol modules, and the one or more PSE controllers is in a different physical location from the only one of the switching device and the PHY device.

* * * * *